(12) United States Patent
Xu

(10) Patent No.: US 6,535,206 B1
(45) Date of Patent: Mar. 18, 2003

(54) ULTRASONIC WIRELESS PEN POSITION DETERMINATION SYSTEM AND METHOD

(75) Inventor: Jianping Xu, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/507,078

(22) Filed: Feb. 18, 2000

(51) Int. Cl.[7] .......................... G09G 5/00; G08C 21/00; G06K 11/18

(52) U.S. Cl. .................... 345/179; 345/158; 178/18.01; 178/19.01; 178/19.02

(58) Field of Search ................................ 345/179, 180, 345/182, 183, 173, 158; 178/18.01, 19.02, 19.01

(56) References Cited

U.S. PATENT DOCUMENTS

| | | | | |
|---|---|---|---|---|
| 4,506,354 A | * | 3/1985 | Hansen ........................ | 367/101 |
| 4,814,552 A | * | 3/1989 | Stefik et al. .................. | 178/18 |
| 4,862,152 A | * | 8/1989 | Milner ........................ | 340/712 |
| 5,142,506 A | * | 8/1992 | Edwards ..................... | 367/127 |
| 5,308,936 A | * | 5/1994 | Biggs et al. .................. | 178/18 |
| 5,977,958 A | | 11/1999 | Baron et al. ................. | 345/179 |

OTHER PUBLICATIONS

Brenner, A., et al., "A Sonic Pen: A Digital Stylus System", *IEEE Transactions On Computers*, C–19, 546–548, (Jun. 1970).

* cited by examiner

Primary Examiner—Dennis-Doon Chow
Assistant Examiner—Alecia D. Nelson
(74) Attorney, Agent, or Firm—Schwegman, Lundberg, Woessner & Kluth, P.A.

(57) ABSTRACT

The invention in one embodiment provides a system and method for determining the position of an ultrasonic pen device, and for providing calculated position information to a computer system. The system of one embodiment comprises a first and second ultrasonic sensor that detect an ultrasonic signal emitted by an ultrasonic pen. The system further includes analog-to-digital converters to digitize the sensed ultrasonic signal and a processor to process the ultrasonic signal and determine the position of the ultrasonic pen.

Some embodiments of the invention incorporate an algorithm that comprises calculating a first ultrasonic signal arrival time and calculating a second ultrasonic signal arrival time, and that further comprises using the first and second arrival times in calculating a final ultrasonic signal arrival time.

15 Claims, 4 Drawing Sheets

ULTRASONIC WIRELESS PEN POSITION DETERMINATION SYSTEM AND METHOD

FIELD OF THE INVENTION

The invention relates generally to ultrasonic position determination in computer peripheral devices, and more specifically to an ultrasonic wireless pen system and method for providing pen-based input to a computerized system.

BACKGROUND OF THE INVENTION

Computers rely on user input and interaction to provide data and to control their operation. This input is, in the case of today's typical personal computer systems, provided via many different types of peripheral input devices. Such devices include keyboards which allow a user to type text that is then provided in electronic form to the computer, include mice which allow a user to provide coordinate information and switch actuated input to the computer by moving a mouse and depressing its buttons, and include more specialized devices such as graphics tablets that enable a user to draw with a special pen on a graphics tablet to provide coordinate and pressure information to the computer.

Keyboards are efficient for providing text data to computers for those with adequate typing skill and that need to input a large amount of text. But, efficient use of a keyboard requires special knowledge that must be obtained by practice, making the keyboard undesirable even as a method for text entry for those with poor typing skills. Inputting graphical or coordinate information via a keyboard is also quite difficult even for the skilled, as the data must be entered by depressing keys on the keyboard such as by entry of text representing the graphic or by use of cursor keys to provide position information.

Mice do a much better job of facilitating input of position information, and are commonly used to operate graphical interfaces to software and to draw or position objects on a computer screen. Movement of a mouse on a solid surface results in transmission of coordinate information that reflects the mouse's movement to the computer, such that the computer can use the data to perform functions such as drawing an object or positioning a cursor. Depressing buttons on a mouse also provides a signal to the computer, which is used for functions such as to indicate selection of an object currently under a cursor on a computer screen. But, a mouse cannot easily be used to input text information, and a mouse is not as easy to draw with as are common noncomputerized items such as pens and pencils.

Use of a graphics tablet with a special pen enables the user to simulate use of a common writing utensil such as a traditional pen or pencil with which the user is comfortable, and so does not require adapting to peculiarities of devices used only in a computer context such as a mouse. A pen is also more versatile than either a mouse or a keyboard, as it allows easy entry of both graphic or positioning information such as a freehand sketch, and allows entry of text such as may be derived via a user's handwriting with the pen.

But, pen systems such as the graphics tablet described above require a high degree of accuracy in position determination to be practical, so that a user does not have to correct or edit data input with such a pen before it can be used. Also, the pen device should not be cumbersome or complex to use, as the goal is to provide users with a simple and easy method of entering data into a computer.

What is needed is a method and apparatus that enable accurate position determination of a pen-like computer input peripheral device, which is both convenient to use and is reliably accurate.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides a method and apparatus that enable accurate position determination of a pen-like computer input peripheral device, which is both convenient to use and is reliably accurate. The invention in one embodiment incorporates an ultrasonic pen and at least two sensors, each of the sensors capable of receiving and digitizing data to be processed in a processor to determine the position of the pen. The invention in further embodiments includes a novel algorithm for deriving position information from the digitized data, such that the algorithm is implemented in software executing on the processor of the invention.

Figure 1:
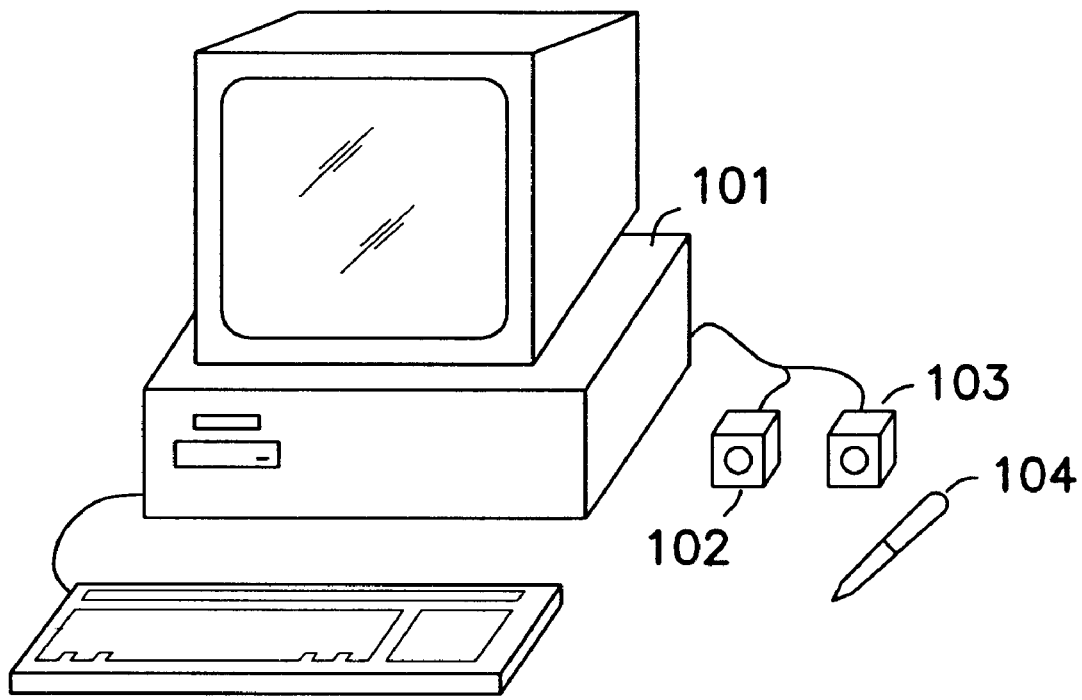
FIG. 1 shows a computer system with an ultrasonic pen device, consistent with an embodiment of the present invention.

FIG. 1 shows a general-purpose computer system 101, which has attached to it two ultrasonic sensors 102 and 103. Ultrasonic pen 104 is moved about near the ultrasonic sensors 102 and 103, and in some embodiments emits ultrasonic signal bursts. The sensors 102 and 103 in one embodiment receive the signal bursts, and through knowledge of the speed of sound in air and using geometry to triangulate the relative position of the pen can calculate the absolute position of the pen with respect to the sensors 102 and 103, provided that the emitting time of the burst signal is known. In some embodiments, the sensors 102 and 103 are physically connected and at a fixed distance to each other, to reduce the need to calibrate the system to compensate for sensor positions that differ relative to each other. Note that the sensors and system as described cannot distinguish between pen positions in front of, above, or behind the sensors because only two sensors are employed in the embodiment shown. In further embodiments, a third sensor positioned near sensors 102 and 103 but not in line with these sensors is employed to enable derivation of a three-dimensional ultrasonic pen position. The ultrasonic pen 104 is shown in FIG. 1 as a pen, but need not be or resemble a pen so long as it is suitably movable to allow a user to position the pen, and the pen emits a suitable ultrasonic signal.

Figure 2:
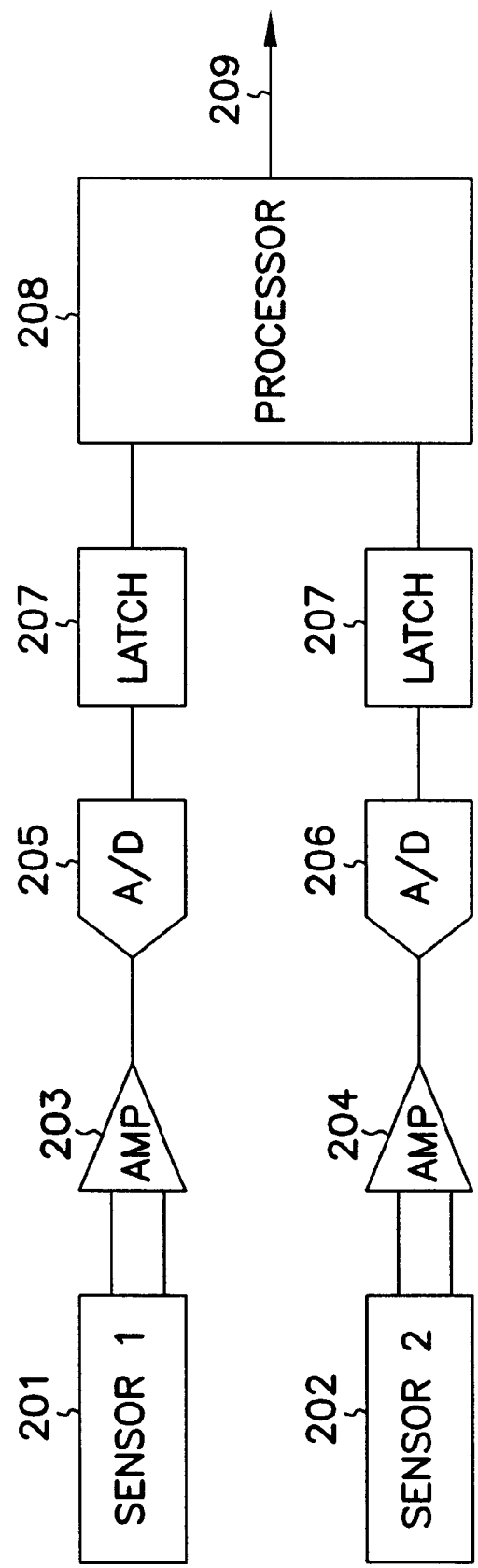
FIG. 2 shows a block diagram of an ultrasonic pen device, consistent with an embodiment of the present invention.

FIG. 2 shows a block diagram of sensors 201 and 202, and the related circuitry of one embodiment of the invention. Sensors 201 and 202 receive the ultrasonic signal emitted by the ultrasonic pen, and convey the respective signals to amplifiers 203 and 204. The amplifiers provide an amplified signal to analog-to-digital converters 205 and 206, which then provide a digital representation of the signal to the respective latches 207 and 208. The latched data for each channel is then provided to the processor 208, which implements an algorithm in software to determine the position of the ultrasonic pen and provide the data to a computer interface at 209. In further embodiments, the processor also implements digital filtering such as band-pass filtering in processing the received data. The processor 208 is in various embodiments a digital signal processor (DSP), or any other suitable processor. The hardware elements of FIG. 2 are in some embodiments incorporated into ultrasonic sensor modules such as are shown at 102 and 103 of FIG. 1, are incorporated into an interface board in a general-purpose computer, or are distributed between a computer, ultrasonic sensor modules, or other hardware.

Figure 3:
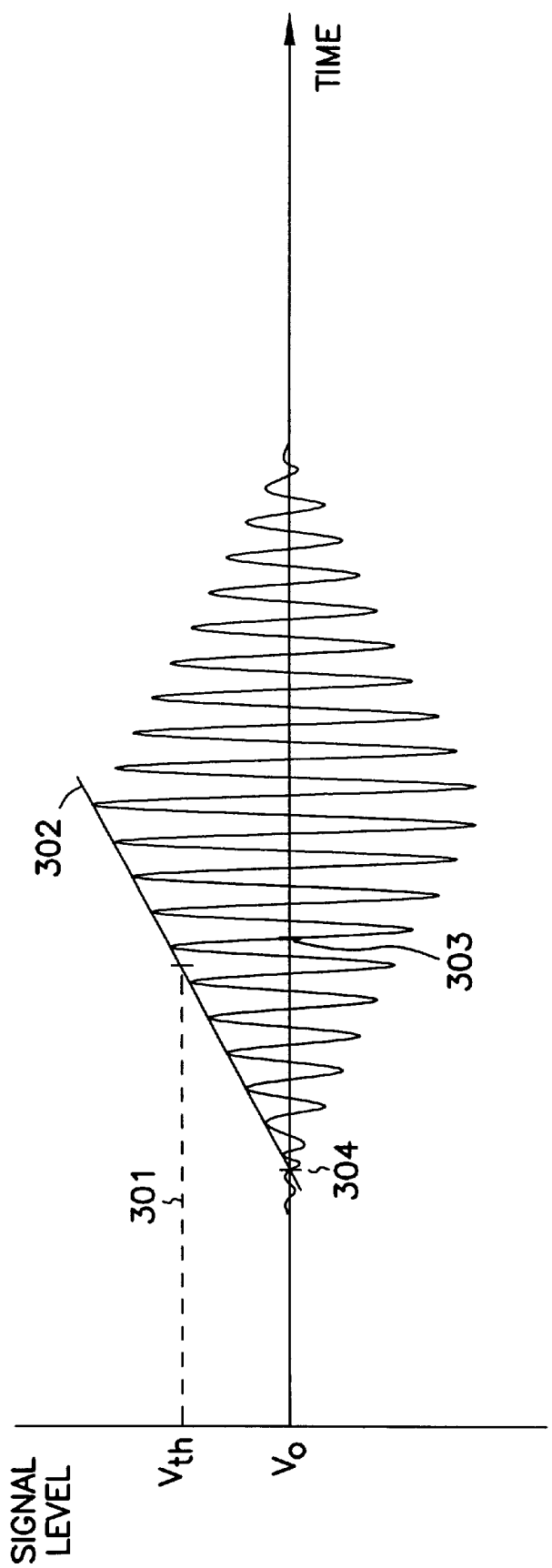
FIG. 3 shows an ultrasonic waveform, consistent with an embodiment of the present invention.

FIG. 3 shows a sample waveform signal level versus time as is received by the ultrasonic sensors in one embodiment of the invention. The waveform of FIG. 3 is used here in conjunction with the flowchart of FIG. 4 to describe the signal processing algorithm of various embodiments of the invention.

Figure 4:
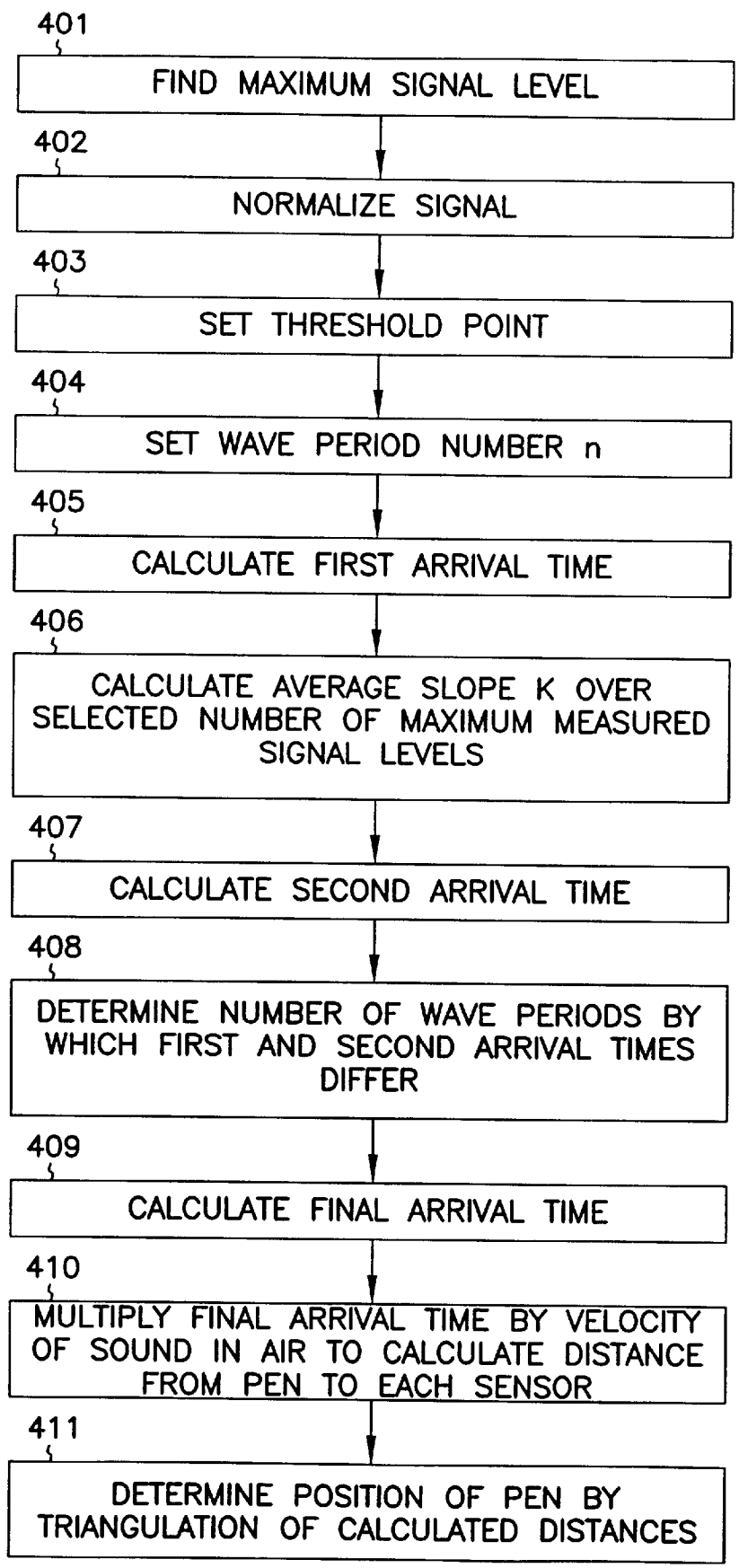
FIG. 4 shows a flowchart of a method of deriving the location of an ultrasonic pen, consistent with an embodiment of the present invention.

At 401 of FIG. 4, the digitized waveform provided by each ultrasonic sensor is analyzed to find the maximum signal level. This maximum signal level is then used to normalize the signal, or to scale the signal to a desired range of amplitude at 402. The scaled or normalized signal is then analyzed to determine a threshold point at 403. Determination of the threshold point is done in some embodiments by specifying the threshold point as some fraction of the maximum signal level of the normalized signal, such as 50% of the normalized maximum signal level. In an alternate embodiment, the threshold point is set at or near the middle of an approximately linear range of increasing maximum signal level amplitudes of the digitized signal. This is shown at point 301 which is labeled Vth in FIG. 3, which lies at approximately the center of line 302 connecting the maximum sampled signal levels over the approximately linear range.

A wave period number n is determined at 404, which represents the number of wave periods between arrival of the ultrasonic signal and a zero crossing point near the threshold point. In various embodiments, this is the zero crossing point nearest the threshold point, is the zero crossing point immediately preceding the threshold point, or is the zero crossing point immediately following the threshold point. In FIG. 3, the zero crossing point 303 immediately following the threshold point is chosen, resulting in a wave period number n of six periods of detectable signal before the zero crossing point 303.

A first arrival time can then be calculated at 405 by subtracting the wave period number n periods of time from the time at the zero crossing point. This time represents a first calculated actual time at which the first detectable ultrasonic signal is received by a particular sensor.

An average slope K over a number of signal maximums near the threshold point 301 is determined at 406. The number of signal maximums is in some embodiments a selected number such as four or five that will be likely to give a suitably accurate indication of the slope of the signal maximums near the threshold point. In other embodiments, the slope K is the slope of the linear portion of the increasing signal amplitudes as shown at 302. The slope K is used at 407 to determine a second arrival time, by extrapolating the zero crossing point of a line passing through a maximum amplitude point and having a slope K. In FIG. 4, line 302 approximates a line having slope K and passing through a maximum amplitude point near the threshold point, and indicates a zero crossing point as shown at 304.

Then the first and second calculated arrival times are compared to determine the number of wave periods by which the arrival times differ at 408. A final arrival time can then be calculated at 409, by adding the first arrival time to the rounded difference time calculated by subtracting the first arrival time from the second arrival time and rounding the difference to the nearest whole multiple of wave periods. For example, a first arrival time of 0.060 seconds and a second arrival time of 0.055 seconds with a wave period of 0.002 seconds would result in a final time of 0.060 seconds added to (0.055−0.060) or −0.005, where the difference −0.005 seconds must be rounded to the nearest whole multiple of a wave period. Because a wave period is 0.002 seconds in this example, the nearest multiple corresponding to −0.005 is either two wave periods, which is equal to −0.004 seconds, or three wave periods, which is equivalent to −0.006 seconds, depending on the rounding criteria implemented. Therefore, the calculated final arrival time is equal to 0.060+(−0.004)=0.056 seconds in embodiments where a value halfway between wave periods is rounded to the lower number multiple of wave periods, and is equal to 0.060+(−0.06)=0.054 seconds in embodiments where a value halfway between wave periods is rounded to the higher number multiple of wave periods.

The final arrival time value is in some embodiments multiplied by the velocity of sound in air at 410 to calculate the distance from the ultrasonic pen to the sensor. The distance from the ultrasonic pen to each sensor is used at 411 in some embodiments to geometrically calculate a coordinate position of the pen to be provided to the computer through calculation widely known as triangulation. The coordinate position is then used by the computer in various embodiments to control a cursor, to detect and recognize handwriting, or to otherwise utilize or process the data provided by the ultrasonic pen system.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof

I claim:

1. An ultrasonic pen peripheral device for inputting data to a computerized system, the ultrasonic pen peripheral device comprising:
   an ultrasonic pen operable to emit an ultrasonic signal;
   a first ultrasonic sensor comprising an analog-to-digital converter, the first ultrasonic sensor operable to receive the ultrasonic signal emitted by the ultrasonic pen and to convert the signal to a first digital signal via the analog-to-digital converter;
   a second ultrasonic sensor comprising an analog-to-digital converter, the second ultrasonic sensor operable to receive the ultrasonic signal emitted by the ultrasonic pen and to convert the signal to a second digital signal via the analog-to-digital converter; and a processor, operable to receive the first digital signal from the first ultrasonic sensor and the second digital signal from the second ultrasonic sensor, and to derive the position of the ultrasonic pen from the first and second digital signals;

wherein the processor derives the position of the ultrasonic pen from the first and second digital signals by performing the following for each of the first and second digital signals:

setting an ultrasonic signal threshold point;

setting a wave period number representing the number of wave periods between arrival of the ultrasonic signal and a selected zero crossing point near the threshold point;

calculating a first arrival time of the ultrasonic signal by subtracting the wave period number of periods of time from the time at which the zero crossing point is reached;

calculating an average slope K over a selected number of measured maximum signal levels near the threshold point;

calculating a second arrival time of the ultrasonic signal by extrapolating the zero crossing point of a line that passes through a peak value at or near the threshold point and that has a slope of the calculated average slope K;

determining the number of wave periods by which the first and second arrival times differ; and calculating a final arrival time that is equal to the first arrival time added to the rounded difference obtained by subtracting the second arrival time from the first arrival time and rounding the resulting time to the nearest whole number multiple of wave periods of time.

2. The ultrasonic pen peripheral device of claim 1, wherein the processor further:

searches for the maximum signal level of the signal acquired by each of the first and second ultrasonic sensors; and normalizes the signal levels acquired by each of the first and second ultrasonic sensors.

3. The ultrasonic pen peripheral device of claim 1, wherein setting an ultrasonic signal threshold point comprises setting the threshold point to approximately half of a maximum signal level.

4. The ultrasonic pen peripheral device of claim 1, wherein setting an ultrasonic signal threshold point comprises setting the threshold point to a signal level corresponding to approximately the middle of a linear slope range of acquired signal maximums.

5. The ultrasonic pen peripheral device of claim 1, wherein the processor further derives the position of the ultrasonic pen by multiplying the final arrival time by the velocity of sound in air.

6. The ultrasonic pen peripheral device of claim 1, wherein the processor further derives the position of the ultrasonic pen by triangulation using the final arrival time and the position of each of the first and second ultrasonic sensors.

7. An ultrasonic pen peripheral device for inputting data to a computerized system, the ultrasonic pen peripheral device comprising:

a first ultrasonic sensor comprising an analog-to-digital converter, the first ultrasonic sensor operable to receive the ultrasonic signal emitted by an ultrasonic pen and to convert the signal to a first digital signal via the analog-to-digital converter;

a second ultrasonic sensor comprising an analog-to-digital converter, the second ultrasonic sensor operable to receive the ultrasonic signal emitted by the ultrasonic pen and to convert the signal to a second digital signal via the analog-to-digital converter; and a processor, operable to receive the first digital signal from the first ultrasonic sensor and the second digital signal from the second ultrasonic sensor, and to derive the position of the ultrasonic pen from the first and second digital signals;

wherein the processor derives the position of the ultrasonic pen from the first and second digital signals by performing the following for each of the first and second digital signals:

setting an ultrasonic signal threshold point;

setting a wave period number representing the number of wave periods between arrival of the ultrasonic signal and a selected zero crossing near the threshold point;

calculating a first arrival time of the ultrasonic signal by subtracting the wave period number of periods of time from the time at which the zero crossing point is reached;

calculating an average slope K over a selected number of measured maximum signal levels near the threshold point;

calculating a second arrival time of the ultrasonic signal by extrapolating the zero crossing point of a line that passes through a peak value at or near the threshold point and that has a slope of the calculated average slope K;

determining the number of wave periods by which the first and second arrival times differ; and calculating a final arrival time that is equal to the first arrival time added to the rounded difference obtained by subtracting the first arrival time from the second arrival time and rounding the resulting time to the nearest whole number multiple of wave periods of time.

8. A method of deriving the location of an ultrasonic pen, comprising:

receiving an ultrasonic signal emitted by the ultrasonic pen in a first ultrasonic sensor and converting the signal to a first digital signal via an analog-to-digital converter;

receiving an ultrasonic signal emitted by the ultrasonic pen in a second ultrasonic sensor and converting the signal to a second digital signal via an analog-to-digital converter; and deriving the position of the ultrasonic pen from the first and second digital signals in a processor;

wherein the processor derives the position of the ultrasonic pen from the first and second digital signals by performing the following for each of the first and second digital signals:

setting an ultrasonic signal threshold point;

setting a wave period number representing the number of wave periods between arrival of the ultrasonic signal and a selected zero crossing point near threshold point;

calculating a first arrival time of the ultrasonic signal by subtracting the wave period number of periods of time from the time at which the zero crossing point is reached;

calculating an average slope K over a selected number of measured maximum signal levels near the threshold point;

calculating a second arrival time of the ultrasonic signal by extrapolating the zero crossing point of a line that passes through a peak value at or near the threshold point and that has a slope of the calculated average slope K;

determining the number of wave periods by which the first and second arrival times differ;

calculating a final arrival time that is equal to the first arrival time added to the rounded difference obtained by subtracting the first arrival time from the second arrival time and rounding the resulting time to the nearest whole number multiple of wave periods of time.

9. The method of claim 8, wherein the processor further:

searches for the maximum signal level of the signal acquired by each of the first and second ultrasonic sensors; and normalizes the signal levels acquired by each of the first and second ultrasonic sensors.

10. The method of claim 8, wherein the processor further derives the position of the ultrasonic pen by multiplying the final arrival time by the velocity of sound in air.

11. The method of claim 8, wherein the processor further derives the position of the ultrasonic pen by triangulation using the position and calculated final arrival time of each of the first and second ultrasonic sensors.

12. The method of claim 8, wherein setting an ultrasonic signal threshold point comprises setting the threshold point to approximately half of a maximum signal level.

13. The method of claim 8, wherein the processor further derives the position of the ultrasonic pen by triangulation using the position and calculated final arrival time of each of the first and second ultrasonic sensors.

14. A machine-readable medium with instructions stored thereon, the instructions when executed operable to cause a computer to:

set an ultrasonic signal threshold point for an ultrasonic signal emitted by an ultrasonic pen and received by an ultrasonic sensor;

set a wave period number representing the number of wave periods between arrival of the ultrasonic signal and a selected zero crossing point near the threshold point;

calculate a first arrival time of the ultrasonic signal by subtracting the wave period number of periods of time from the time at which the zero crossing point is reached;

calculate an average slope K over a selected number of measured maximum signal levels near the threshold point;

calculate a second arrival time of the ultrasonic signal by extrapolating the zero crossing point of a line that passes through a peak value at or near the threshold point and that passes a slope of the calculated average slope K;

determine the number of wave periods by which the first and second arrival times differ;

calculating a final arrival time that is equal to the first arrival time added to the rounded difference obtained by subtracting the first arrival time from the second arrival time and rounding the resulting time to the nearest whole number multiple of wave periods of time.

15. The machine-readable medium of claim 14, the instructions further operable to cause a computer to:

search for the maximum signal level of the signal acquired by an ultrasonic sensor; and normalize the signal level acquired by an ultrasonic sensors.

* * * * *

UNITED STATES PATENT AND TRADEMARK OFFICE
CERTIFICATE OF CORRECTION

PATENT NO.   : 6,535,206 B1
DATED        : March 18, 2003
INVENTOR(S)  : Xu

It is certified that error appears in the above-identified patent and that said Letters Patent is hereby corrected as shown below:

<u>Column 4,</u>
Line 30, delete "(-0.06)" and insert -- (-.006) --, therefor.

<u>Column 8,</u>
Line 34, delete "sensors" and insert -- sensor --, therefor.

Signed and Sealed this

Eighth Day of July, 2003

JAMES E. ROGAN
*Director of the United States Patent and Trademark Office*